June 27, 1933. H. W. WALLACE 1,915,876
FISHHOOK BAITING DEVICE
Filed Nov. 25, 1931
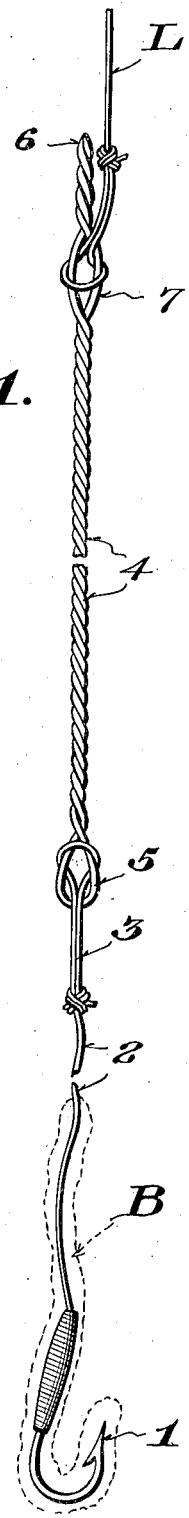
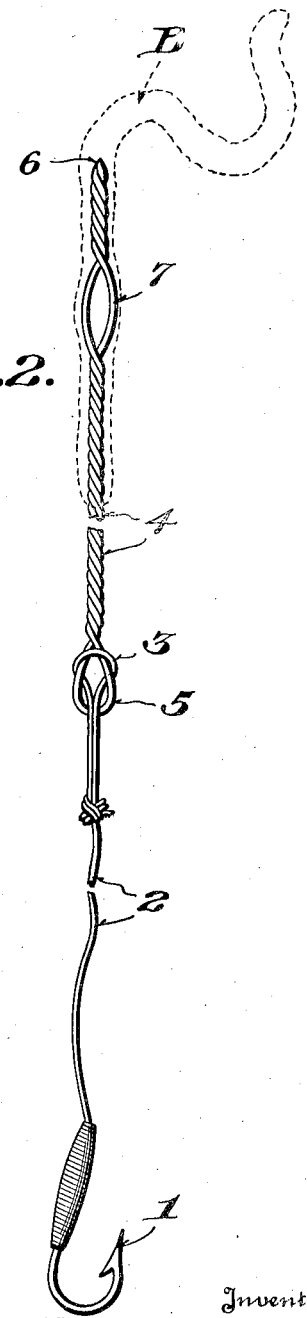
Inventor
H. W. Wallace,
By
Attorney Patented June 27, 1933

1,915,876

UNITED STATES PATENT OFFICE

HENRY W. WALLACE, OF EMBUDO, NEW MEXICO

FISHHOOK BAITING DEVICE

Application filed November 25, 1931. Serial No. 577,321.

This invention relates to improvements in fish hook baiting devices, and more particularly to baiting devices employed in connection with hand lines or the like.

In the present day practice of baiting fish hooks, it is customary to thread the bait over the hook from the pointed end of the same, which often results in damage of the bait so that firm securement of the bait to the hook cannot be had, and moreover, often results in complete destruction of the bait so that same is rendered unserviceable. The present invention therefore aims to overcome these disadvantages and further aims to secure the bait to the hook so as to render the latter entirely invisible and present the bait naturally to the fish.

Further the invention aims to provide a baiting needle or the like which glitters and acts as a lure when moving through the water, whether attached to a spinner or direct to the gut leader or line.

Another object of this invention is to provide a device of the above character which may be easily and quickly attached to the leader for threading the bait onto the hook and which is provided with means for attaching the same directly to the fishing line.

Still another object is to provide a device of the above character which is of needle or bodkin-like formation which may be readily attached to or detached from the leader of a fish hook for readily applying bait in the form of worms, bugs, or strip meat, to the hook in a quick and efficient manner without damage to the bait as is the case with the present day practice.

Still another object is to provide a device of the above character which will permit the bait to be placed upon the fish hook in a manner to prevent the stealing of the bait by the fish, viz; by completely concealing the hook and the shank of the latter within the bait.

These and other objects will be apparent throughout the course of the following description and drawing; in which:

Fig. 1 is an elevation of the invention disposed between the fishing line and the leader of the fish hook; and Fig. 2 is an elevation of the invention showing the device attached to the leader of a fish hook with the bait shown in dotted lines to illustrate the manner of starting the bait over the body of the device.

Referring in detail to the drawing, 1 indicates a fish hook having attached to one end thereof a gut leader 2, the latter being formed at its free end with a bight or loop portion 3. The present invention consists of a body formed of a single piece of twisted wire 4 doubled upon itself at one end to form a bight or loop portion 5 and having its free ends pointed as at 6. The spirally wound or twisted wire 4, has its sides spread apart, adjacent the pointed end 6 to provide a loop or eye 7 for a purpose to be now fully described.

In operation, the bight portion 5 is connected to the loop 3 of the hook leader in the manner shown and the pointed end 6 is then threaded or forced through the bait B as disclosed in dotted lines in Fig. 2. The threading of the bait is continued until the latter reaches the position shown in dotted lines in Fig. 1 of the drawing. After the bait has been positioned upon the hook, the body member 4 may be detached from the leader 2 whereupon the latter is directly connected to the fishing line.

However, if it is so desired, the body or needle 4 may be attached to the fishing line L by connecting the latter to the eye 7 whereupon the body 4 forms a continuation and in effect is a part of the leader 3.

The wire employed is preferably of a bright color so as to glitter and consequently act as a lure when moving through the water. Because of the structure supra, in addition to ease of construction, greater flexibility is obtained, so that the needle can be readily folded and will occupy a minimum of space. In addition the range of usefulness is increased because the needle can be attached to any and all sizes and shapes of hooks, snells, spoons, and spinners.

What is claimed is:

1. A baiting needle consisting of a wire bent upon itself to form a loop at one end for receiving a connecting element of a fishing hook and having portions thereof bent outwardly in opposite directions to form an eye closely adjacent to the opposite end of the wire for receiving a connecting element of a fishing line, whereby to cause substantially the entire weight of the needle to be applied to the fishing line at a point below the lower end of the fishing line, said opposite end being sharpened to form a bait penetrating point, said wire between the loop and the eye and between the eye and the point being twisted to form a pair of continuous uninterrupted parts for threading through the bait.

2. A baiting needle composed of a wire-like member having a part at one end thereof for connection to a fishing hook and having its opposite end sharpened to form a bait-penetrating point, and a part on the member closely adjacent to the bait-penetrating point for connection to a fishing line whereby to cause substantially the entire weight of the needle to be applied to the fishing line at a point below the lower end of the fishing line, the member between said parts and between the point and the second named part being continuous and uninterrupted so as to enable the bait to be threaded over the member and onto the hook without rupture of the bait.

In testimony whereof I affix my signature.

HENRY W. WALLACE.